Jan. 24, 1950   H. P. BENTLEY ET AL   2,495,438
WORK MANIPULATOR

Filed May 29, 1946   3 Sheets-Sheet 1

INVENTORS:
Harold P. Bentley
AND Ralph P. LaVonier,
BY Theodore E. Simonton
ATTORNEY.

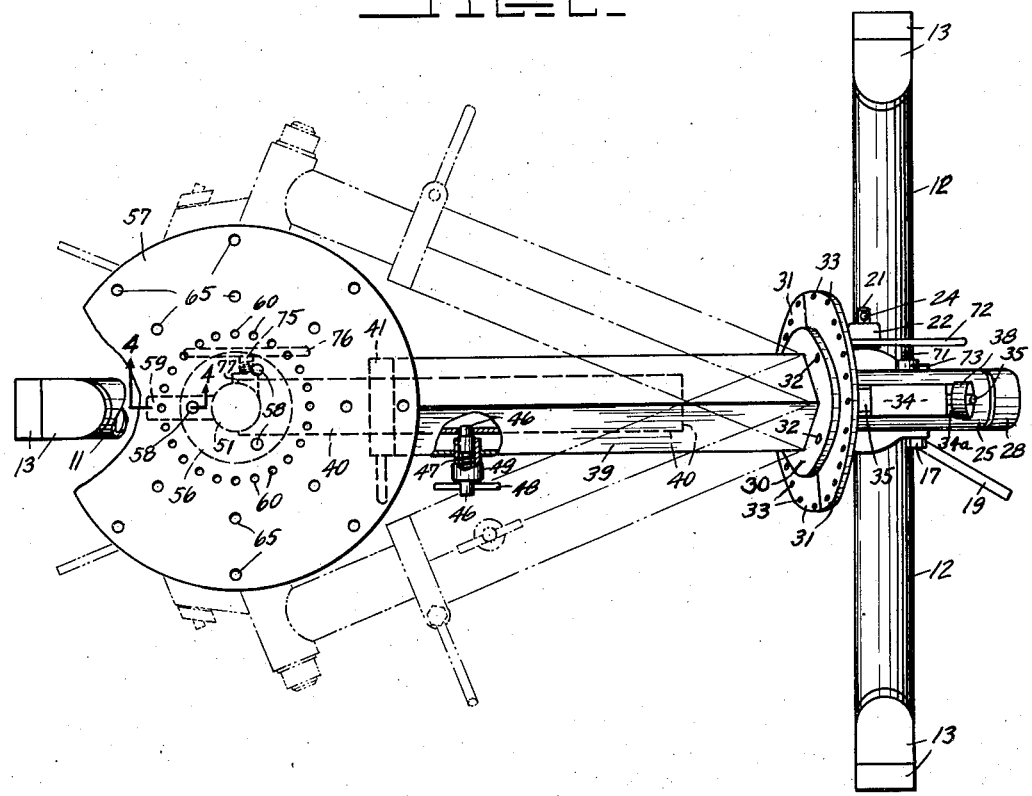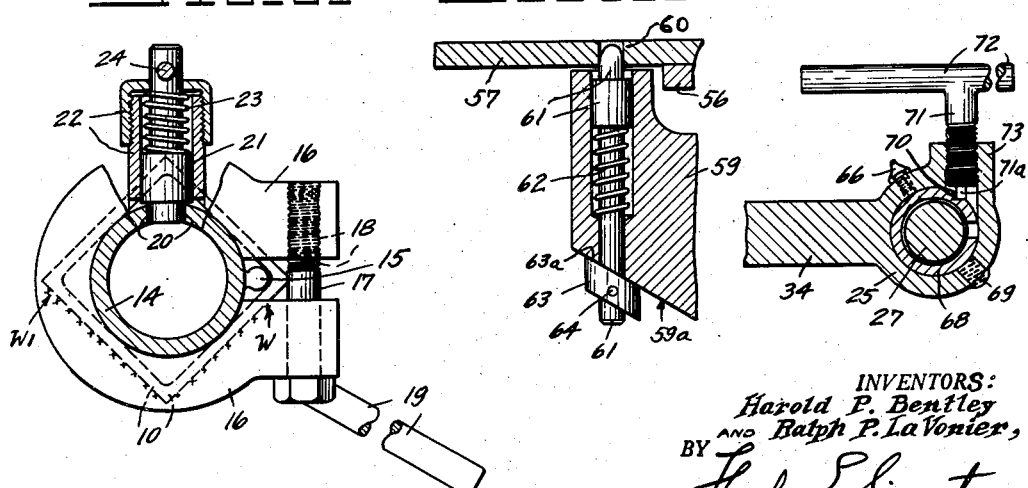

Jan. 24, 1950   H. P. BENTLEY ET AL   2,495,438
WORK MANIPULATOR
Filed May 29, 1946   3 Sheets-Sheet 3
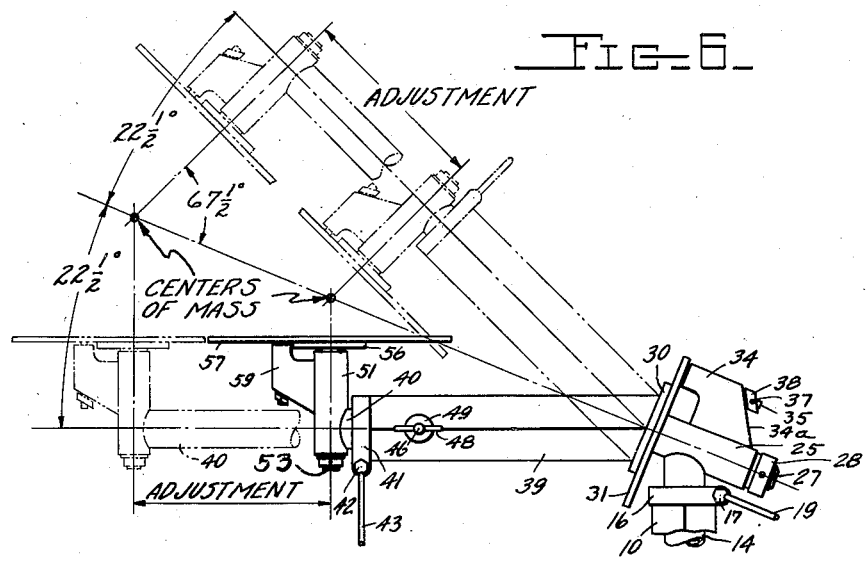
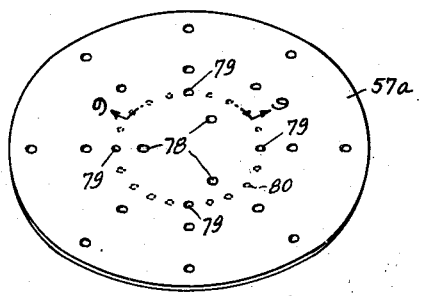
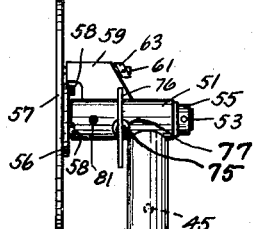
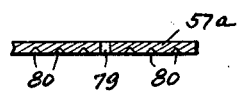
INVENTORS:
Harold P. Bentley
AND Ralph P. LaVonier,
BY Theodore L. Simonton
ATTORNEY Patented Jan. 24, 1950

2,495,438

UNITED STATES PATENT OFFICE 2,495,438

WORK MANIPULATOR

Harold P. Bentley and Ralph P. La Vonier, Syracuse, N. Y., assignors to Bentley Weldery, Inc., Syracuse, N. Y., a corporation of New York Application May 29, 1946, Serial No. 673,049

3 Claims. (Cl. 29—288)

The invention relates to improvements in work manipulators, and, more particularly, to work manipulators of the kind employed to support, move and variably position work for efficient performance of welding, grinding, assembly or other operations on the work. For handling wide varieties of jobs, work manipulators of this kind should be capable of use in connection with work varying widely in shape and varying in weight from a few pounds to several hundred pounds and also should be capable of imparting a wide variety of movements and positions to the work.

The general purposes of the invention are to provide a work manipulator of the kind above set forth whereby welding, grinding, assembly or other operations may be easily, conveniently and safely performed on work varying widely in shape and weight; whereby the work mounted in the manipulator may be readily and easily positioned by hand in one or more of a wide variety of positions for convenient performance of the required operation or operations by a workman or workmen; and whereby there is provided a work manipulator characterized by sturdiness and compactness and by a high degree of accessibility by a workman to the supported work and by a safe and durable rotative and tiltable mount for the work supporting head of the manipulator.

A further purpose of the invention is to provide a work manipulator of the kind set forth having improved means for supporting a work holder or head for rotation about an axis and for variable tilting of the axis of rotation of said holder or head.

A further purpose of the invention is to provide a work manipulator of the kind set forth having improved means for supporting work in such manner that the work may be rotated about one axis and tilted about a second axis with said axes intersecting at an angle of less than 90 degrees at, or substantially at, the center of mass of the supported work, and, particularly, to provide a manipulator having simple and safe means for adjusting the point of intersection of said axes to coincide with the combined center of mass of the particular work and of the parts of the manipulator which are movable with the work about said two axes to shift the position of the work.

Other purposes and advantages of the invention will appear from the following description in detail of the illustrative embodiments of the invention shown in the accompanying drawings.

In the drawings:

Figure 2 is a top plan view showing the manipulator in loading position in full lines and showing the manipulator in two other adjusted positions thereof in dotted lines;

Figure 3 is a detail sectional view of the manipulator on the line 3—3 of Figure 1;

Figure 4 is a detail sectional view on the line 4—4 of Figure 2;

Figure 5 is a detail sectional view on the line 5—5 of Figure 1;

Figure 6 is a fragmentary side elevation of the manipulator showing schematically how the manipulator may be adjusted for tilting and rotation of work about the center of mass of the work;

Figure 7 is a view of a modified form of the manipulator embodying only certain of the parts of the manipulator shown in Figures 1 to 6;

Figure 8 is a perspective view showing a modified form of work supporting head or face plate; and Figure 9 is a fragmentary sectional view on the line 9—9 of Figure 8.

Figure 1:
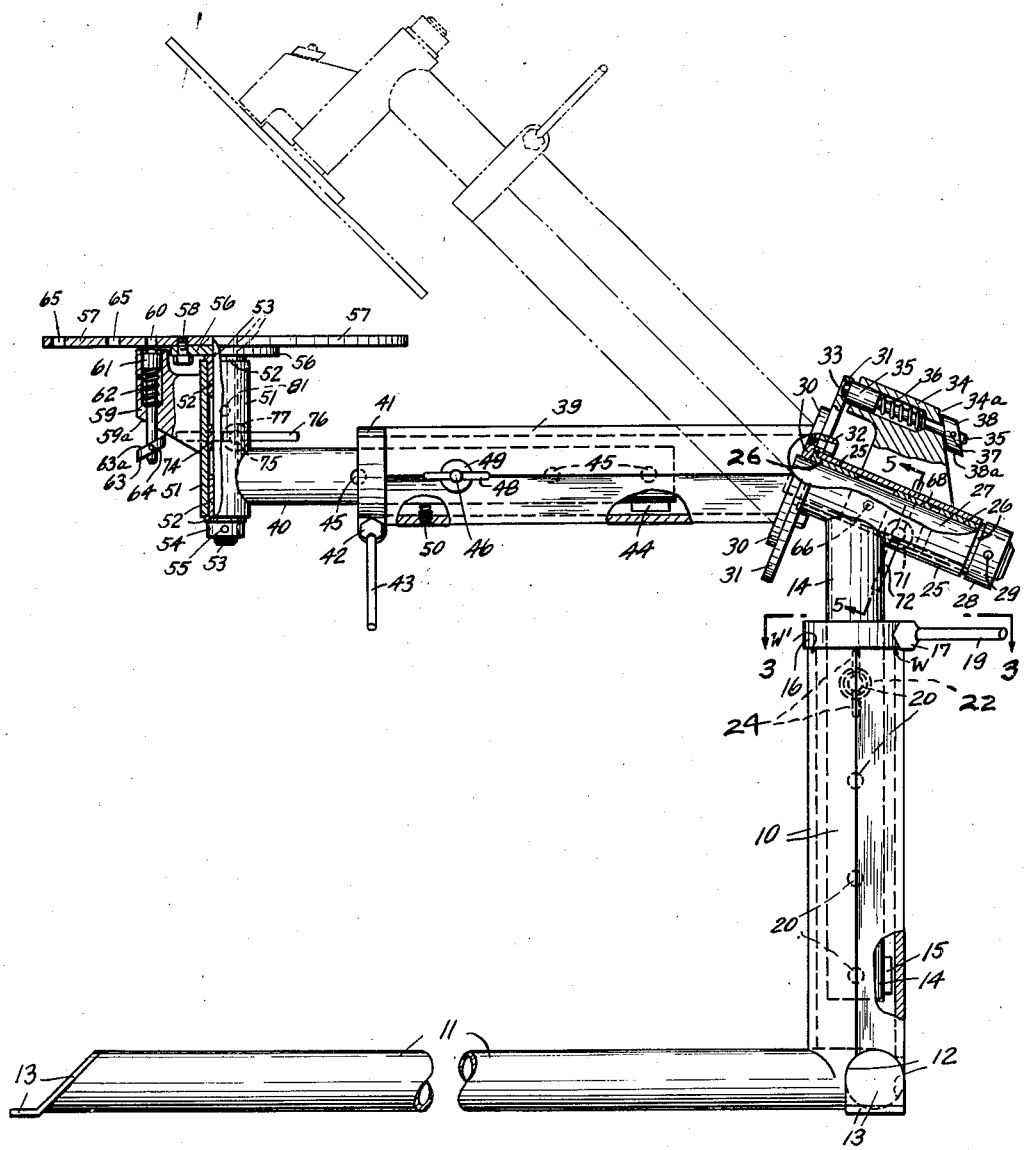
Figure 1 is a side elevation of a work manipulator embodying the invention, showing the manipulator in loading position in full lines and in a different position in dotted lines.

The manipulator as shown in Figures 1 to 6 first will be described, said manipulator being constructed of metal parts. The manipulator has a rigid frame or support comprising a vertically disposed pedestal or column 10 and a T-shaped ground or floor engaging base. The T-shaped base comprises two straight lengths of tubing 11 and 12 welded or otherwise rigidly united, part 11 forming the stem and part 12 the cross-member of the T-shaped base. The column 10 is of hollow construction, and is of square cross-section internally and externally thereof and is welded or otherwise rigidly affixed at its lower end to the base 11—12 at the juncture of parts 11 and 12 of the base. The ends of the tubular members 11 and 12 of the base are preferably closed by angle plates 13 welded or otherwise affixed thereto, preferably with a part of each plate disposed below the plane of members 11 and 12 as shown to afford three spaced ground contact points on the base. Two opposed corners of the rectangular column 10 are aligned in the vertical plane of the axis of stem part 11 of the base. The column 10 may be of integral form, or may be formed by welding two angle irons together.

A post 14, which may be solid, but preferably is of tubular form as shown, is vertically slidably adjustable in column 10, the external diameter of post 14 being such that it lightly contacts each of the four walls of column 10 medially of the width of said walls. Turning of the post in the column is prevented by a short key 15 rigidly affixed to the post by welding or otherwise adjacent the lower end of the post. The key extends longitudinally of the post and at the exterior of the post and slides along one internal corner of the column 10 when the post is moved up and down.

A yoke-like resilient metal clamping member 16 embraces post 14 at the upper end of column 10 and is rigidly held to the upper end of column 10 for about half way around the post and column preferably by welding said clamp to the upper end edge of column 10 from point W to point W'. The post 14 may be frictionally held in different adjusted positions and may be released for adjustment by turning a bolt 17 which extends loosely through one leg of the clamping member 16 and is threaded in the other leg of the member at 18. Preferably a handle 19 is welded or otherwise fixed to the head of bolt 17 to facilitate turning of the bolt to tighten and loosen the grip of the clamping member 16 on post 14.

To positively lock the post 14 in predetermined adjusted positions, a row of vertically spaced holes 20 are provided in the post, and a locking plunger 21 is mounted in a housing 22 carried by column 10 adjacent the upper end of the column for engagement of the reduced inner end of the plunger in any selected one of said holes. A spring 23 urges the plunger to locking position, and the outer end of the plunger protrudes from the housing and has a cross-bar or handle 24 held thereto for retracting the plunger to permit adjustment of the post 14.

Extending across and fixed to the upper end of post 14 is a cylindrical sleeve 25 which, intermediate its ends, is welded or otherwise rigidly secured to the upper end of the post, and which is inclined at an angle to the horizontal plane of the base 11—12. Fitting in opposite ends of the sleeve 25 are two tubular bearing bushings 26 for a short spindle 27 which extends through the sleeve, each bushing having at its outer end a circumferential end-thrust-taking flange abutting the adjacent end of the sleeve. One end of the spindle projects slightly from the lower end of the inclined sleeve and has a collar 28 held thereto by a pin 29 to abut the flange of the adjacent bushing. The other end of the spindle projects slightly from the higher end of the sleeve and has a disk-like and centrally apertured head 30 welded or otherwise rigidly secured thereto and abutting the flange of the adjacent bushing.

A diametrically divided and centrally apertured disk 31 loosely encircles the latter bushing and is removably clamped to the adjacent face of head 30 by bolts 32 passing through the disk and threaded into the head. Disk 31 is provided with a circular set of holes 33 concentric with the spindle 27 and the axis of the disk. Welded or otherwise rigidly secured to the inclined sleeve 25 and extending upward therefrom is a housing 34 for a latch plunger 35 which has a reduced end selectively engageable in holes 33 to latch spindle 27 in different predetermined turned positions of the spindle. A spring 36 normally urges the plunger to latching position. The other end of the plunger protrudes from the housing and has fixed thereto by a pin 37 a disk-like button or knob 38 having a cam face 38ª inclined to its axis and rotative in contact with an inclined face 34ª of housing 34 to rotate and retract the plunger from an engaged one of the holes 33 and frictionally hold the plunger in retracted position when said knob is manually turned out of the position shown.

A straight telescopically extensible and contractible arm is rigidly held at one end thereof to the head 30 of spindle 27 at the face of said head opposite that to which disk 31 is clamped. This extensible arm and the spindle 27 are turnable as a unit and are arranged at such an angle to each other that the axial lines of the arm and spindle lie in the same plane and intersect at the juncture plane of the arm and head 30, so that when the unit is turned in its bearings in sleeve 25 the outer end of the extensible arm will travel in a circular path around the axial line of the spindle 27.

The two telescopically interfitted members of the telescopically extensible and contractible arm consist of a hollow or tubular arm member 39 of square cross-section, and a hollow or tubular arm member 40 of cylindrical cross-section. Member 39 corresponds in construction and cross-sectional shape and dimensions to pedestal 10 and has a beveled end thereof welded or otherwise rigidly held to the outer face of head 30 of spindle 27. Member 40 corresponds in construction and cross-sectional shape and dimensions to post 14 and slides in and out in member 39. Member 40 is provided with a short key 44 extending longitudinally thereof adjacent its inner end and welded or otherwise secured thereto to slide in one corner of member 39, said key corresponding in shape and dimensions to key 15. To prevent accidental withdrawal of member 40 entirely out of member 39, a stop pin 50 (Figure 1) may be threaded into member 39 for engagement by key 44.

Member 39 has mounted at its outer end, and embracing member 40, a clamp comprising a yoke-like resilient clamping member 41, bolt 42 and bolt handle 43, said clamp being identical in construction with the clamp 16—17—18—19 and having member 41 thereof welded part way therearound to the outer end edge of member 39 in the same way that member 16 is welded to member 10. By tightening the clamp 41—42—43 the member 40 may be frictionally held to member 39 in any adjusted position of member 40. Member 40 is further provided with a longitudinal row of holes 45 corresponding in size to holes 20 in post 14 and engageable selectively by a spring pressed latch 46—47—48 (comprising plunger 46, spring 47 and handle 48) corresponding in construction to the spring pressed latch 21—23—24, and mounted in a housing 49 welded or otherwise held to member 39 near the outer end of the latter, said housing corresponding to housing 22 of latch 21—23—24. By means of latch 46—47—48 and holes 45, the arm member 40 may be positively locked to arm member 39 in predetermined adjusted positions.

A short cylindrical bearing sleeve 51 for the spindle of a rotative work carrier or support extends across, and is welded or otherwise rigidly held to the outer end of arm member 40 with the sleeve axis normal to the axial line of the arm 39—40. Fitted in opposite ends of the sleeve 51 are two cylindrical bearing bushings 52 similar to bearing bushings 26 in bearing sleeve 25 and having at their outer ends thrust-receiving circumferential flanges abutting the respective ends of sleeve 51. A short spindle 53 is journaled in said bushings 52 and extends through sleeve 51 with its ends protruding slightly from the ends of the sleeve. A collar 54, which is fixed on one end of the spindle 53 by a pin 55, abuts the flange of one of the bushings 52, and one face of a disk-like head 56 abuts the flange of the other bushing. Head 56 is welded or otherwise rigidly held to the adjacent end of spindle 53 and forms a support for a detachable work-carrying fixture or work holder which, in the construction shown, is a disk-like face plate 57 clamped to the outer face of head 56 by bolts 58 which pass through the head 56 and are threaded into said face plate 57. The spindle 53 is normal to head 56 and face plate 57.

Welded or otherwise rigidly held to bearing sleeve 51 is a housing 59 in which is mounted a spring pressed latch for the work holder or face plate 57, said housing and latch being constructed as in the case of the housing and latch carried by bearing sleeve 25. The face plate 57 is formed concentric with its axis with a circular set of holes 60 to selectively receive the reduced end of latch plunger 61 to positively hold plate 57 and spindle 53 and its head 56 in predetermined positions against rotation. The tip of the reduced end of plunger 61 is rounded as shown. A spring 62 normally urges the plunger to latching position. A disk-like button or handle 63 is pinned by a pin 64 to the other end of the plunger and has an inclined cam face 63ª rotative in contact with an inclined face 59ª of housing 59 to simultaneously rotate and retract the plunger, upon manual rotation of the handle 63, and adapted to hold the plunger released when desired. Face plate 57 is provided with variously spaced holes 65 for use in fastening work in various positions to the outer face of the face plate so that the center of mass of the work fastened to the outer face of the plate may be located on the axial line of the plate and its spindle 53.

In each of the bearing sleeves 25 and 51, an annular space is provided between the spaced ends of the spindle bushings and between the sleeve and spindle, which space is adapted to receive a supply of lubricant in grease or other form through a port which is normally closed by a closure device threaded therein. The closure device for sleeve 25 is designated 66 and that for sleeve 51 is designated 81.

Each bearing sleeve 25 and 51 also carries a friction brake for the spindle journaled therein. The two brakes are of identical construction, the details of such construction being best shown in Figure 5. The brake for spindle 27 comprises a resilient split band 68 of friction producing metal, such as steel, encircling the spindle in the lubricant receiving space in sleeve 25, with the ends of the band spaced slightly apart. Adjacent one end thereof, the band 68 is rigidly anchored to the sleeve 25, as by a weld 69, and adjacent its other end is provided in its outer side with a socket 70 substantially tangential to the spindle 27. The brake is shown released in Figure 5 and, when so released, the band 68 inherently expands into contact with the sleeve and very slightly out of contact with the spindle. To apply the brake there is threaded through the sleeve, substantially tangential to the spindle, a thrust screw 71 having a handle 72 at its outer end and a reduced non-threaded inner end portion 71ª extending into socket 70 in band 68. The wall of the sleeve 25 is preferably thickened by a boss 73 where the screw 71 is threaded through the sleeve. By screwing the screw 71 inward, the band may be contracted to grip the spindle with such pressure as may be desired to exert variable braking force on the spindle. The parts of the identical brake for spindle 53 in sleeve 51 are designated as follows: 74 is the brake band, 75 is the screw, and 76 is the screw handle. The boss on sleeve 51 through which the screw 75 is threaded is designated 77.

The modified construction shown in Figure 7 consists of a simpler assembly consisting of certain only of the parts of the manipulator above described and shown in Figures 1 to 6. The modified construction provides a manipulator which can be used where tilting of the axis of rotation of the rotatable work carrier or head is not necessary. In this modified assembly of parts above described, the arm member 40 of the manipulator is inserted, as shown, into the pedestal 10 carried by base 11—12. A manipulator of the construction shown in Figures 1 to 6 may be readily converted by a user into one constructed as shown in Figure 7.

In Figures 8 and 9 a modified form of detachable work carrier or face plate 57ª is shown which may be substituted for the carrier or face plate 57 shown for each of the above described manipulators. This plate 57ª has a set of threaded holes 78 (similar to holes 58 in plate 57) for attachment thereof to head 56 of spindle 53 by bolts 58, and also has a circular set of holes 79 and sockets 80 arranged in a single circle concentric with the center of the plate 57ª for coaction with latch plunger 61. In the construction shown in Figures 8 and 9, four equi-spaced holes 79 are provided spaced 90° apart around the center of the plate, these holes being similar to holes 60 in plate 57 for positive latching of plate 57ª by the latch plunger, and intermediate shallow conical or flared sockets 80 are provided in the plate 57ª between the holes 79 to receive only the outer part of the rounded tip of the latch plunger 61. When the rounded tip of the plunger engages in a socket 80, it exerts only a detent action on the plate so that, upon forcible rotation of the plate, the plunger will be cammed out of any socket 80 in which it is engaged and will snap into the next socket 80 or hole 79 (as the case may be) presented thereto. Whenever the plunger engages in one of the four holes 79, the plate will be positively locked until the plunger is manually retracted. Other combinations of holes and/or sockets than those shown obviously may be provided in plates 57 and 57ª.

In the manipulator shown in Figures 1 to 6, wherein the work holding head 57 is turnable about two axes which intersect at an acute angle, the fixed angle at which these axes intersect is an angle of 67½ degrees, and the axis of spindle 27 is inclined at a fixed angle of 22½ degrees to the horizontal ground engaging plane of the base 11—12. This arrangement is highly advantageous for variably positioning the work for many welding and other operations. It also permits placing of the work holding head in a horizontal plane with its work supporting face uppermost, when the extensible arm and the head are in their lowest position of motion around the axis of spindle 27, for convenient loading and anchoring of the work on the head with the center of mass of the work intersected by the axis of rotation of the head and its supporting spindle 53. However, these angles may be varied so long as they are so arranged that the two axes always intersect at a fixed angle less than 90 degrees in all adjusted positions of the manipulator.

In using the manipulator, the work to be handled is placed on the work-holding head and secured thereto by suitable known means in such position that the axial line of the plate or work holding head 57 or 57ª and of the spindle 53 to which it is fixed passes through the center of mass of the work. The extensible and contractible arm 39—40 is then adjusted so that the axial line of spindle 27 also passes through the center of mass of the work and of the arm 39—40 and head all combined, or approximately therethrough, so that the axis of the two spindles intersect at, or approximately at, said center of the mass of the unit formed by the work, arm and head combined. With the manipulator so loaded, the work is statically balanced, or substantially so balanced, and no matter what the weight of the work may be, its position may be manually changed with very slight effort by rotating the work holder about its axis, by turning the extensible arm about its axis, or by both turning the head and the arm. It is thus possible to easily manipulate the mounted work into a wide variety of positions while it is held to the head, and the constantly balanced, or substantially balanced, support of the work by the manipulator greatly reduces danger of the work getting out of control of the operator.

The latches illustrated for releasably latching the work holding head and the arm 39—40 against rotation, and the friction brakes provided for spindles 27 and 53 also are all highly desirable. For example, either or both friction brakes may be completely released, or either or both brakes may be applied with varying grip to variably resist turning of the respective spindles or even to frictionally grip the spindles so tightly that the spindles are at least substantially frictionally locked against turning. For example, also, the releasable latch plungers 35 and 61 for latching the arm 39—40 and the work holding head may be simply pulled out of locking position and allowed to snap into the next hole presented thereto to effect a positive latch, or either of said plungers may be rotated and retracted by its operating cam handle or button and held retracted by said cam handle after release of the handle.

Where a work holding head such as head 57ª shown in Figures 8 and 9 is employed, the latch plunger 61 will positively lock the head in either of several rotated positions of the head and, intermediate each two adjacent ones of the holes 79 in said head, the rounded tip of the plunger will seat partly in each of the sockets 80 in said head and may be cammed out of said sockets successively by forcible rotation of the head. This latter arrangement permits positive and impositive latching of the head 57ª at selected points and, as the head is turned from one positive locking position to another, the operator can feel and hear and count the engagements of the plunger in the sockets 80 and know just how far he has turned the head.

When the latch plunger 61 for the head 57 or 57ª is held locked in released position by its cam handle 63, the head may be freely turned by hand or by the force of a blast of shot, sand, paint, or the like, directed against work on the head. The positive and impositive latching means and the braking means are usable in many other ways separately and combined to impose desired restraints on the supported work to hold it in desired fixed positions, and to permit controlled change of position of the work, as may be required by the operation or operations to be performed on the work.

The construction of the telescopic pedestal column 10—14 and of the telescopic arm 39—40 permits easy relative sliding of the two telescoped parts of the column and of the arm without great precision of manufacture, and also provides clearance spaces along the corners of members 10 and 39 to receive dirt, sand, etc., which may find its way between the telescopically interfitted parts. This is important as work manipulators of the class described are usually operated in surroundings where much sand, grit and the like are present. The two clamp members 16 and 41 also aid in preventing dirt entering the parts 10 and 39. The keys on members 14 and 40 are adapted to enter members 10 and 39 only at a single predetermined corner of each member between the legs of the respective clamping members 16 and 41.

The T-shaped base 11—12, and the arrangement of the column 10—14 and of arm 39—40 relatively thereto, provides a very compact and stable manipulator which permits easy and complete access to the work.

When either of the latch plungers 21 and 46 is released, it will snap into the next locking hole presented thereto. This feature is desirable to prevent sudden extensive accidental movements of the parts latchable by these latches, such as may sometimes accidentally occur.

In the modified form of manipulator shown in Figure 7, the work holding head is movable only about its own axis. The more elaborate manipulator of Figures 1 to 6 may be converted into the simpler manipulator of Figure 7, when desired, by merely removing certain parts of the manipulator of Figures 1 to 6 and inserting part 40 thereof into part 10 thereof as shown in Figure 7.

We claim:

1. A work manipulator of the class described comprising a T-shaped ground engaging base, a vertical pedestal having telescopically interfitted sections all of which are incapable of relative turning movement while interfitted and the lower one of which is fixed at its lower end to the base at the junction of the stem and cross members of the base, means for releasably holding the pedestal sections variably longitudinally adjusted, a spindle bearing fixed to and extending across the upper end of the upper section of said pedestal, a spindle journaled in said bearing with the spindle inclined at an angle of 22½ degrees to the ground engaging plane of the base and lying in a common vertical plane with the stem portion of the base with the higher end of the spindle over said stem portion, a straight arm having telescopically interfitted sections all of which are incapable of relative turning movement while interfitted and one of which at one end of said arm is fixed to the higher end of said inclined spindle, means for releasably holding the arm sections variably longitudinally adjusted, a second spindle bearing fixed to the other end section of said arm, a second spindle journaled in said second spindle bearing with the spindle normal to said arm, and a work holder held to one end of the second spindle to rotate therewith about the axis thereof in a plane normal to said second spindle, said arm extending at such an angle to the first spindle that the axes of the two spindles intersect at an angle of 67½ degrees throughout the range of longitudinal extension of said arm and at points which recede from said second spindle in response to extension of said arm.

2. A work manipulator of the class described comprising a pedestal having a flatwise seatable base, a spindle bearing fixed to the pedestal above said base, a spindle journaled in said bearing with the spindle held inclined by said bearing at a fixed angle of 22½ degrees to the seating plane of said pedestal base, a straight longitudinally extensible arm having telescopically interfitted sections all of which are incapable of relative turning movement while interfitted and one of which at one end of said arm is fixed to that end of said inclined spindle which is farthest from the seating plane of the pedestal base to rotate with said spindle, means for releasably holding said sections of the arm variably longitudinally adjusted, a second spindle bearing fixed to the other end section of said arm, a second spindle journaled in said second spindle bearing with said spindle held normal to said arm by said bearing and projecting at one end of the spindle beyond said arm part way to the axis of the first spindle, said arm extending at such an angle to the first spindle that the axes of the two spindles intersect at an angle of 67½ degrees throughout the range of longitudinal extension of the arm and at points which recede from said one end of the second spindle in response to extension of the arm, and a work holder supported by said second spindle and held thereto to rotate therewith in a plane normal thereto with the holder positioned at said one end of said second spindle with the axis of said spindle passing centrally through the holder.

3. A work manipulator, as claimed in claim 2, having means for locking the first spindle against rotation in different selected rotated positions thereof in its bearing, and means for locking the second spindle against rotation in different selected rotated positions thereof in its bearing.

HAROLD P. BENTLEY.
RALPH P. LA VONIER.

REFERENCES CITED

The following references are of record in the file of this patent:

UNITED STATES PATENTS

| Number | Name | Date |
|---|---|---|
| 289,179 | Tregurtha | Nov. 27, 1883 |
| 554,419 | Hall | Feb. 11, 1896 |
| 974,253 | Forg | Nov. 1, 1910 |
| 1,216,552 | Dodge | Feb. 20, 1917 |
| 1,275,311 | Schumacher et al. | Aug. 13, 1918 |
| 1,349,633 | Staley | Aug. 17, 1920 |
| 1,453,901 | Andersen | May 1, 1923 |
| 1,495,894 | Du Bois | May 27, 1924 |
| 1,514,262 | Santmyer | Nov. 4, 1924 |
| 1,616,727 | Williams | Feb. 8, 1927 |
| 1,852,387 | Wiedern | Apr. 5, 1932 |
| 1,875,761 | Power | Sept. 6, 1932 |
| 1,907,846 | Mandernack | May 9, 1933 |
| 2,318,791 | Mueller | May 11, 1943 |
| 2,329,613 | Hokanson et al. | Sept. 14, 1943 |
| 2,390,428 | Disse | Dec. 4, 1945 |
| 2,396,161 | Cullen | Mar. 5, 1946 |

FOREIGN PATENTS

| Number | Country | Date |
|---|---|---|
| 179,616 | Great Britain | May 4, 1922 |